United States Patent [19]

Grumet et al.

[11] Patent Number: 4,490,849

[45] Date of Patent: Dec. 25, 1984

[54] CORRELATION PLANE RECOGNITION PROCESSOR

[75] Inventors: Alex Grumet, Whitestone, N.Y.; Martin R. Wohlers, Jr., Hampstead, N.H.

[73] Assignee: Grumman Aerospace Corporation, Bethpage, N.Y.

[21] Appl. No.: 354,722

[22] Filed: Mar. 4, 1982

[51] Int. Cl.³ .............................................. G06K 9/00
[52] U.S. Cl. .................................... 382/31; 244/3.17; 307/351; 350/162.13; 356/71
[58] Field of Search ............... 328/114, 115, 150; 307/354, 362, 350, 351; 350/162.12, 162.13, 162.14, 162.11; 382/31; 250/550; 364/516; 244/3.17; 356/71

[56] References Cited

U.S. PATENT DOCUMENTS

| 3,779,492 | 12/1973 | Grumet | 356/71 |
| 4,091,297 | 5/1978 | Stephens | 307/351 |
| 4,164,728 | 4/1980 | Marsh | 382/30 |
| 4,200,861 | 8/1979 | Hubach | 382/30 |
| 4,342,965 | 8/1982 | Baldwin | 307/360 |

FOREIGN PATENT DOCUMENTS 481209 2/1952 Canada .................. 250/27 PD

Primary Examiner—Leo H. Boudreau
Attorney, Agent, or Firm—John P. Kozma; Richard G. Geib; Daniel J. Tick

[57] ABSTRACT

An automatic processing circuit is associated with an optical matched filter system which supplies correlation imagery representing the products of diffraction patterns of known objects with that of an input scene in which the known objects are to be detected. The disclosed circuitry distinguishes between auto and cross-correlations in the supplied imagery using a number of criteria including peak amplitude, rising slope, peak width, and normalized amplitude.

27 Claims, 11 Drawing Figures

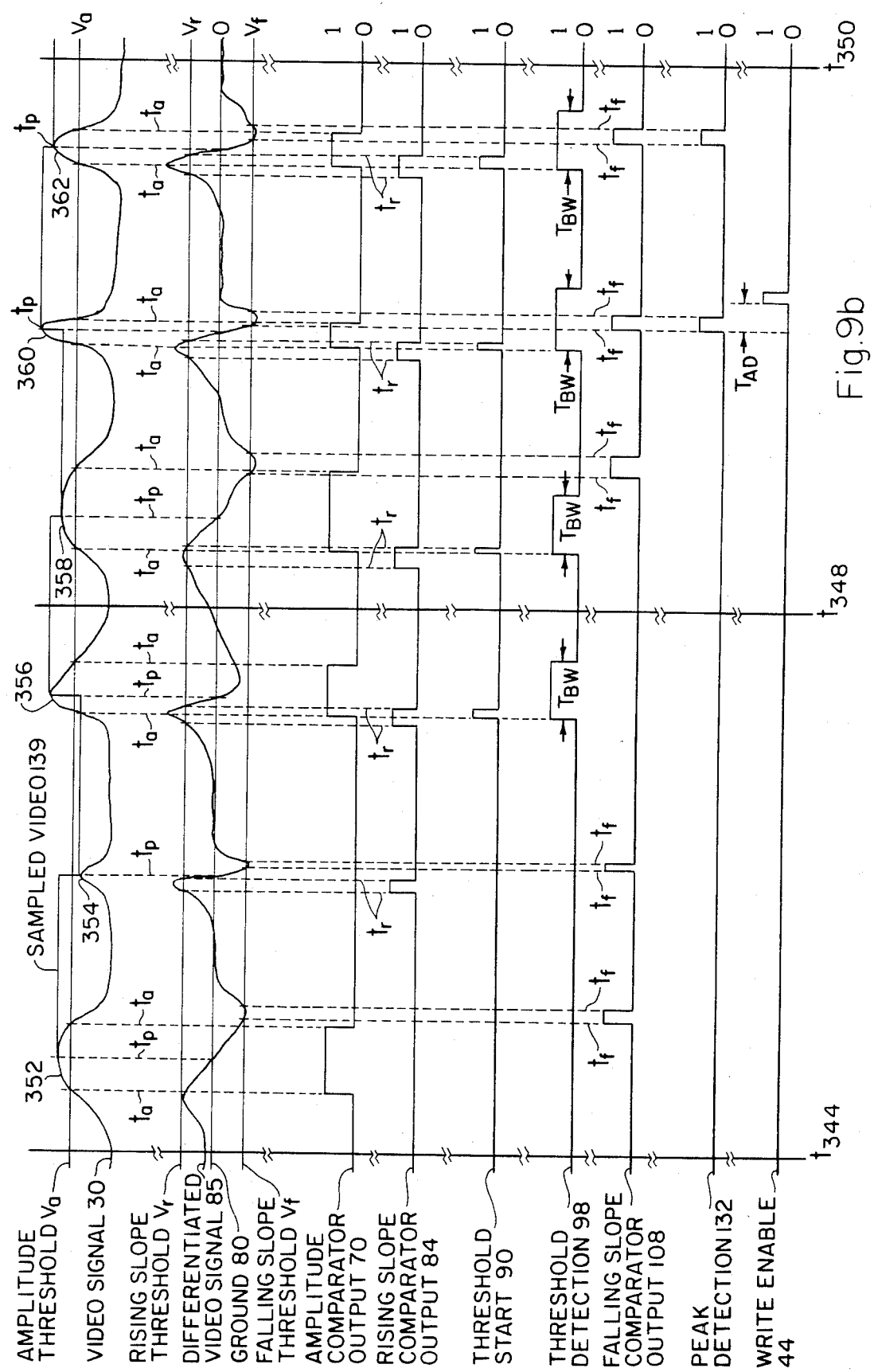

CORRELATION PLANE RECOGNITION PROCESSOR

BACKGROUND

The application of digital techniques to video signal processing has heretofore focused on the manipulation of a digital representation of the entire video signal. U.S. Pat. Nos. 3,707,598; 3,748,644; 3,943,277; and 4,133,004 represent examples of this approach.

Although the speed of digital hardware has increased dramatically over the past decade, real-time manipulation of digital video signals is nevertheless limited by the high information density encountered in video signals. As a result, present digital video systems typically lack flexibility or accuracy; require large areas of digital memory for storing whole input scenes; or depend on expensive high-speed digital components.

Using present teachings, the detection of points of light could be accomplished by comparing the digital video signal with the preset digital threshold, and counting the successive digital samples which meet the threshold to measure the duration of the video pulse. The deficiency manifest in such an implementation is that, unless an extremely high sampling frequency is used, accurate adjustment of the size and sharpness detection criteria for spots or points of light to be accepted is impossible. As a result of this particular shortcoming, digital processing has not been effectively applied to optical matched filters.

The theory of optical spatial filtering is well known. A discussion of the implementation of optical matched filters may be found, for example, in "Signal Detection by Complex Spatial Filtering," by A. Vander Lugt, IEEE Transactions on Information Theory, April 1964, pp 139-145.

An Automatic Target Recognition System is disclosed in U.S. Pat. No. 3,779,492, assigned to the present assignee, which utilizes optical spatial filtering technology. As described, the matched filter system of this patent represents a powerful tool which may be adapted to a number of environments where automatic optical recognition is needed. However, the correlation plane output by the system disclosed in U.S. Pat. No. 3,779,492 may include hundreds of correlation spots or relatively bright points or areas of light which would require a significant effort on the part of a trained operator to interpret. Each correlation spot will have a sharpness proportional to the closeness of the match between the known matched filter object and the input scene object from which it results, but the brightness of each correlation spot depends further on the brightness of the input scene object.

Thus, several factors make it difficult for the operator to recognize autocorrelation spots, representing matched objects. The cross-correlation spots resulting from nearly unmatched objects may overlap nearby auto-correlation spots. Since autocorrelation spots are very sharp points of light, they can, therefore, become "lost" in nearby cross-correlations. Also, a very bright unmatched object can result in a much brighter cross-correlation than the autocorrelation of a poorly illuminated matched object in the input scene.

SUMMARY OF THE PRESENT INVENTION

It is a principal object of this invention to provide a video pulse detector allowing accurate adjustment of the duration and sharpness detection criteria for pulses to be accepted.

Another object is to construct such a detector to output information regarding detected pulses in a form compatible with digital processing hardware.

Another principal object of the present invention to provide an optical matched filter image correlator of the type disclosed in U.S. Pat. No. 3,779,492 with automatic means for discriminating between auto-correlations and cross-correlations.

One further object of this invention is to provide such a correlation plane processor with means for controlling the discrimination criteria.

It is yet another object to supply such a system with means for normalizing the correlations by dividing their amplitudes by the image energy of the input scene object which produces each such correlation.

Yet a further object of the present invention is to supply such a system which may be implemented with one or more standard television cameras and standard logic circuit elements.

These and other objects and advantages are realized in brief by combining analog and digital processing techniques. In the context of the optical filter correlation discriminator, means are provided to scan the correlation plane output of the associated matched filter system to produce a time varying signal in proportion to the light intensity at the scan spot in the correlation plane. The peaks or pulses in this signal, representing correlation spots, are pre-processed such that only those video peaks having values within appropriate ranges of rising slope, amplitude, pulse width and falling slope will be converted to digital format. These peaks are memorized by storing their amplitude, horizontal location and vertical location. Each memorized peak is then normalized by dividing its amplitude by the image energy of a corresponding area in the input scene, obtained by scanning means associated with the input scene. The normalized peaks are displayed in a suitable format to the system operator.

BRIEF DESCRIPTION OF DRAWINGS

A better understanding of the present invention may be had by reference to the appended drawings, in which.

Figure 2:
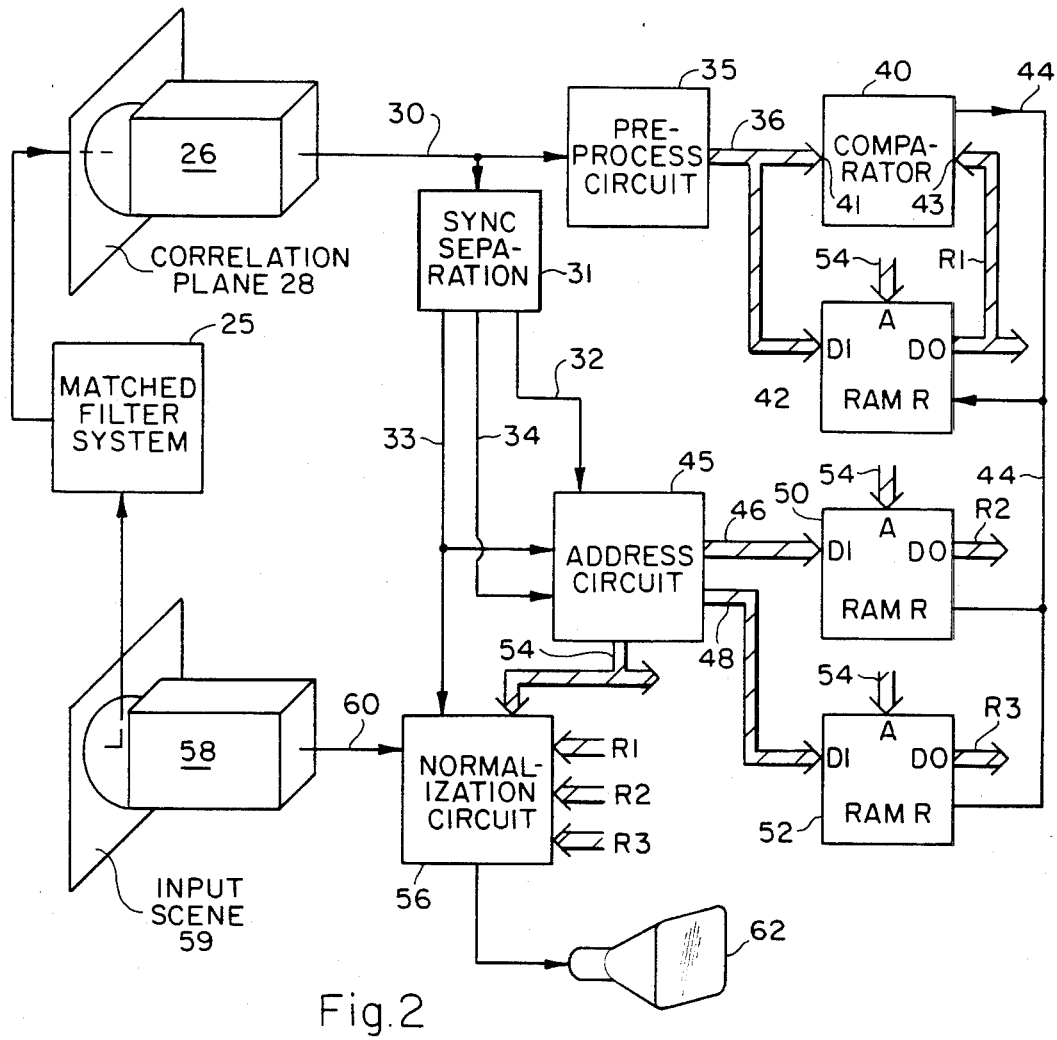
FIG. 2 is a block diagram of the present invention.
Figure 9A:
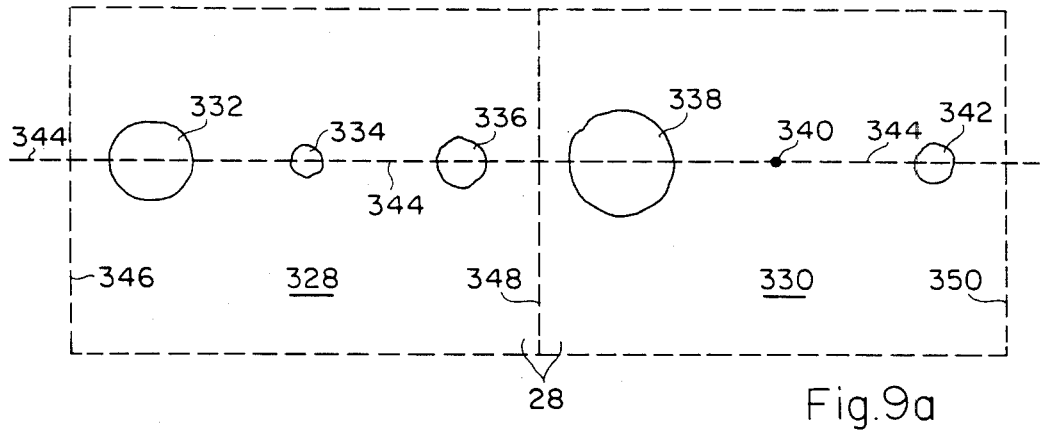

FIG.'s 3, 4 and 5 are circuit diagrams of portions of FIG. 2;

FIG's 6 and 7 are representations of the input scene of FIG. 2;

FIG.'s 8a and 8b are examples of known objects which may be recorded in optical matched filters;

FIG. 9a is a representation of a portion of the correlation plane of FIG. 2; and FIG. 9b shows graphic representations of various signals resulting from the scanning of FIG. 9a.

DETAILED DESCRIPTION OF PREFERRED EMBODIMENTS

Figure 1:
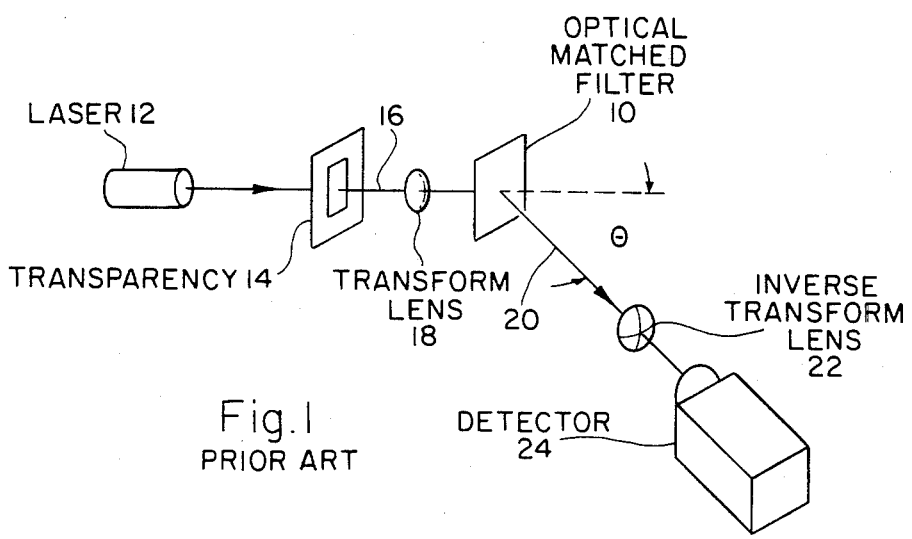
FIG. 1 is a schematic of a typical playback configuration for an optical matched filter.

Referring to FIG. 1, a typical configuration for an optical matched filter 10 is shown. A two-dimensional light intensity function of an input scene is created, for example, by directing a collimated, monochromatic light beam, as from laser 12, through a film transparency 14 of the input scene. The resulting amplitude-modulated beam 16 is directed through a transform lens 18 to produce a spatial Fourier transform or diffraction pattern of the input scene at the plane of matched filter 10.

As explained in the Vander Lugt paper, an optical matched filter may be created on a photographic plate by exposing the plate to a pair of beams from a single monochromatic light source. The first beam, amplitude modulated by imagery from some known object, is directed, with the second unmodulated (reference) beam at an angle $\theta$, toward the plate. The resulting matched filter thus contains a memorized diffraction pattern of the known object, and an incoming beam striking the filter at the identical orientation of the first (modulated) fabrication beam will result in a first conjugate output beam at angle $\theta$ to the incoming beam.

Since the light striking matched filter 10 contains the diffraction pattern for the input scene, first order conjugate beam 20 represents the product of the memorized diffraction pattern of some known object and the diffraction pattern of the input scene. By passing beam 20 through an inverse Fourier transform lens 22, a correlation map, having bright spots or correlations signifying the presence of objects in the input scene similar to the known object of the filter, is obtained. The correlation imagery may be analyzed by placing a suitable detector 24 in the correlation plane, which is the back focal plane of the lens 22.

While the foregoing discussion illustrates the principles of optical matched filters in a single filter configuration, a preferred embodiment of this invention incorporates a multiple filter system, such as that disclosed in U.S. Pat. No. 3,779,492 and designated by call out number 25 in FIG. 2. Thus the correlation plane 28 may include a plurality of non-overlapping correlation maps, each corresponding to a different matched filter. Preferably, the correlation maps are arranged in a regular geometric array in the correlation plane, such as in rows and columns, whereby each map may be identified by a row number and a column number.

Referring more particularly to FIG. 2, a block diagram of a correlation plane recognition processor embodying the present invention is shown.

Scanning means, such as television camera 26, scan the correlation plane 28 to produce a video signal 30. Preferably, video signal 30 is a time varying voltage proportional to a continuous light intensity function representing the light intensity of the correlation imagery at the scan spot in the correlation plane, as would be output by a television camera.

As will be appreciated by those skilled in the art of television imagery, television scanning essentially linearizes a two dimensional picture by breaking the picture into a series of horizontal lines. The linearized signal also includes horizontal and vertical blanking pulses which serve two functions. First, they allow the electron beam of the TV monitor to return to the proper starting position for a new line by "blanking" the signal; and, second, they provide synchronization information which helps insure proper sequencing of the signal to reconstruct the picture.

Conventional television systems employ a technique known as interlacing, whereby each frame is made up of two successively scanned fields separated by vertical blanking pulses. Thus, the first field in each TV frame covers every other scan line, and the missing lines are covered by the second field. Sync separation circuit 31 uses the video signal 30, then, to derive a horizontal sync signal 32 in which pulses indicate the blanking period after each scan line; a gated vertical blanking signal 33 which is pulsed during the alternate vertical blanking periods following each complete TV frame; and an ungated vertical blanking signal 34 which includes pulses after each interlaced field. For a non-interlaced scanning system, only one vertical blanking signal is necessary.

Video signal 30 is also supplied to preprocessing circuitry 35, which in turn outputs a digital video signal 36 to digital comparator 40. In a preferred embodiment, digital video signal 36 is an eight-bit parallel signal corresponding to the amplitude of video signal 30 and updated each time the preprocessing circuitry detects a peak in the video signal. Only those video peaks having values within desired ranges of rising slope, amplitude, pulse width and falling slope, as explained later in this specification will be converted to digital form by circuitry 35.

A digital comparator 40 having inputs 41 and 43 connected to signals 36 and R1 compares the digital video signal 36 each time it is updated with a currently stored video peak amplitude in random access memory (RAM) 42. Comparator 40 outputs a write enable signal 44 which enables the digitized video peak value on signal 36 to be stored in RAM 42 when signal 36 is greater than data output R1 from RAM 42 representing the value of some previously stored peak, (or 0 if no peak has been stored).

Addressing circuitry 45 uses the horizontal signals from sync separation circuit 31 to derive two eight-bit parallel digital output signals 46 and 48 which indicate, respectively, the horizontal and vertical position of the scan spot in the correlation map currently being scanned. These outputs allow the location of each video peak whose amplitude is stored in RAM 42 to be similarly memorized by RAM's 50 and 52. Circuitry 45 also supplies digital signals indicating the column and row number of each correlation map to an address bus 54, which in turn is connected to the address inputs of RAM's 42, 50 and 52. Thus, each matched filter in the optical system 25 is identified by a single address which in turn may be used to access memory locations storing video peak information from the associated correlation map.

It will be appreciated that the elements described thus far are not restricted to detecting correlations from multiple matched filters, but may be used to detect and provide information in digital form for further processing on relatively bright points or areas of light in any general imagery scanned by camera 26. Of course, the specific details of address circuit 45 would have to be modified to implement a desired indexing and adressing scheme to correspond to the scanned imagery. A useful indexing scheme might be for signals 46 and 48 to merely reflect the horizontal and vertical location of the scan spot in the input image, and addressing might be done by advancing the address on bus 54 after each pulse on write enable signal 44. These and other indexing and addressing schemes may readily be implemented by those of skill in the art.

Normalization circuitry 56 is connected to the outputs R1, R2 and R3 of RAM's 42, 50 and 52, as well as address bus 54. A second scanning means 58 scans the input scene 59 to provide circuitry 56 with a video input signal 60 in proportion to the light intensity at the scan spot in the input scene. In practice, if the number of matched filters in system 25 is small, one of the correlation maps may be devoted to the input scene, and the video input signal 60 can be extracted by appropriate gating of the video signal 30 from TV camera 26.

The video peak information in RAM's 42, 50 and 52 is related to the image energy from corresponding areas of the input scene by circuitry 56. Outputs from circuitry 56, in turn, drive display means, such as cathode ray tube 62, which displays a desired set of parameters for each video peak. These parameters might include the location of the peak in the associated correlation map, an identification of the memorized diffraction pattern or matched filter corresponding to the associated correlation map, and a confidence indicator based on the quotient of the amplitude of the video peak divided by the image energy of the associated area in the input scene.

Figure 3:
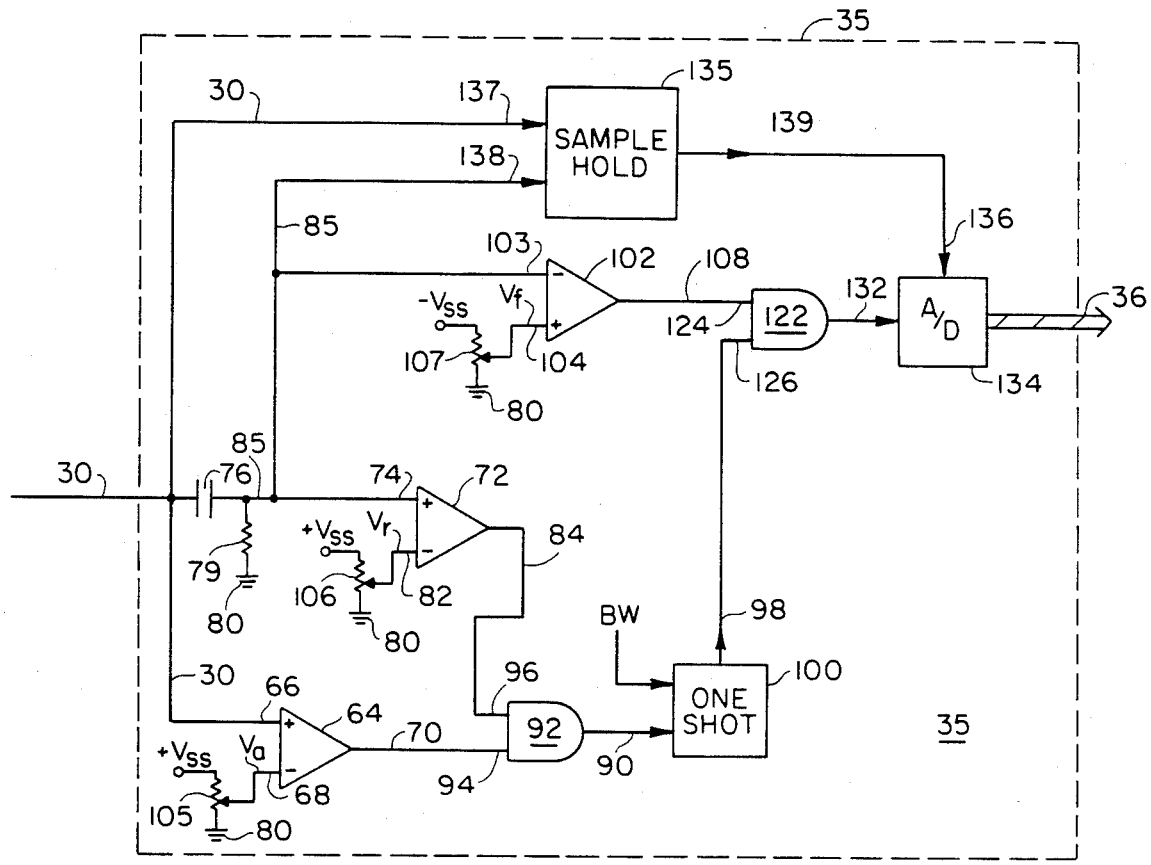

The pre-processing circuitry of block 35, FIG. 2 is detailed in FIG. 3. Referring to FIG. 3, an amplitude comparator circuit 64 has its positive input 66 connected to the video signal 30 and its negative input 68 connected to a desired amplitude threshold voltage $V_a$. Thus, a logical one on the output 70 of comparator 64 indicates that the amplitude of video signal 30 exceeds the desired amplitude threshold voltage.

A rising slope comparator circuit 72 indicates when the amplitude of the video signal 30 is increasing at a rate in excess of a desired rising slope threshold. The positive input 74 of comparator 72 is connected through a differentiating capacitor 76 to the video signal 30 and through a resistor 79 to ground 80, while negative input 82 is connected to a rising slope threshold voltage $V_r$, proportional to the desired rising slope threshold. The resulting output 84 will be a logical one when the differentiated video signal 85 exceeds the desire rising slope threshold.

Comparator outputs 70 and 84 are combined by a first logic gate to produce a threshold start signal 90 indicating the beginning of a video peak. Signal 90 may be taken from the output of AND gate 92 having inputs 94 and 96 connected to outputs 70 and 84 of comparators 64 and 72.

Threshold start signal 90 is used to derive a threshold detection signal 98 in which a threshold pulse indicates the detection of a video peak having values within the desired ranges of amplitude and rising slope. Preferably, the duration of the threshold pulse should correspond to a desired pulse width of the correlation spots which in turn relates to the spatial bandwidth of the memorized diffraction patterns. Derivation of signal 98 may be by means of a variable monostable multivibrator or one-shot circuit 100 having an input connected to the threshold start signal 90. The pulse width of the threshold detection signal 98 output by one-shot 100 may be set by a signal BW provided by automatic control means described later herein.

A falling slope comparator circuit 102, like comparator 72, has an input connected to the differentiated video signal 85, but is arranged to check the falling slope of video signal 30. Thus, negative input 103 of comparator 102 is connected to signal 85, and positive input 104 is connected to a negative falling slope threshold voltage $V_f$ proportional to a desired falling slope threshold. As a result, comparator 102 outputs a falling slope threshold signal 108 which indicates when the video signal 30 is decreasing faster than the falling slope threshold.

The threshold voltages $V_a$, $V_r$ and $V_f$ may be applied by means of a DC supply voltage $V_{ss}$ ($-V_{ss}$ for falling slope threshold) and manually adjusted by potentiometers 105, 106 and 107. Alternatively, $V_a$, $V_4$ and $V_f$ may be supplied by automatic control means described later herein.

The outputs of one shot 100 and comparator 102 are combined by a second logic gate which outputs a peak detection signal 132. As shown, this function is performed by AND gate 122 having inputs 124 and 126 connected to threshold detection signal 108 and falling slope threshold signal 98.

Digital video signal 36 is derived by means of a fast analog-to-digital (A/D) converter 134 enabled by signal 132. To ensure that the maximum peak value or amplitude of each peak is available when peak detection signal 132 indicates that a video peak has been sensed, a sample-and-hold circuit 135 is inserted between video signal 30 and the analog input 136 of converter 132. Circuit 135 has a sampled signal input 137 connected to the video signal and a timing signal input 138 connected to differentiated video signal 85. The sampled video signal 139 output of circuit 135 is held at the level of the sampled signal input 137 level at the instant when the timing input 138 voltage changes from positive to negative.

Figure 4:
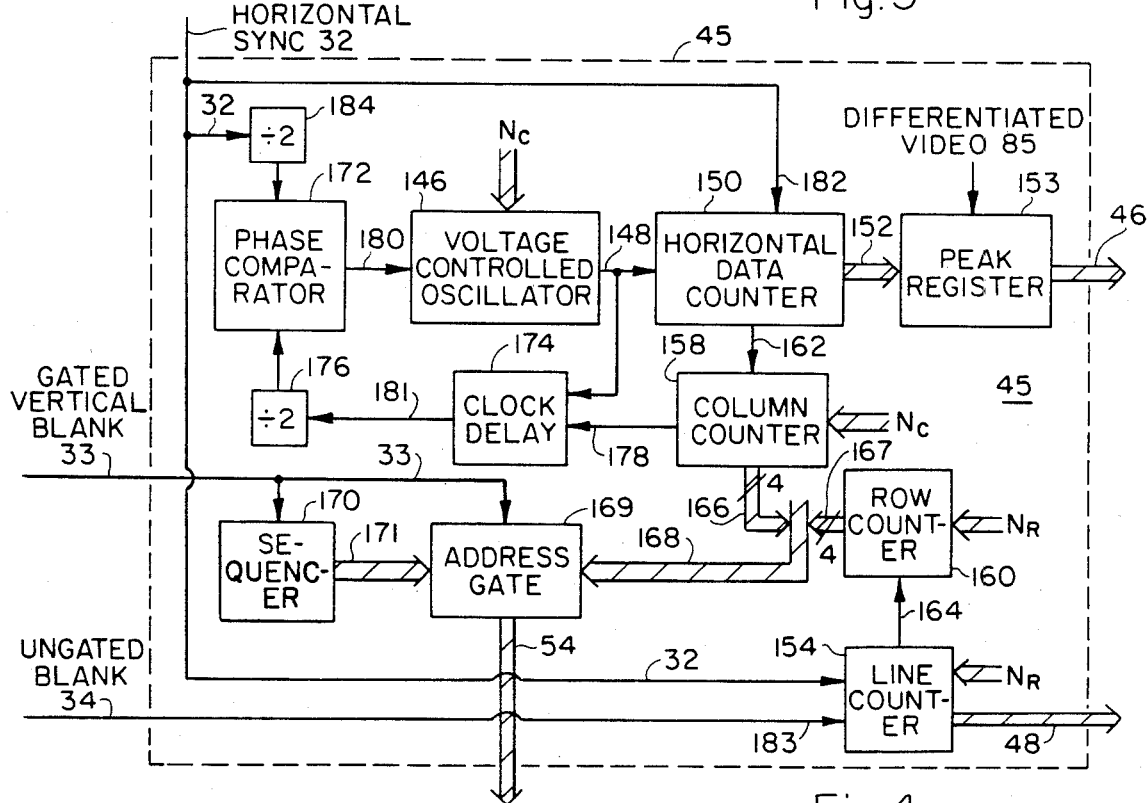

Turning now to FIG. 4, the details of the addressing circuitry block 45 of FIG. 2 are shown. A voltage controlled oscillator (VCO) circuit 146 outputs a horizontal data frequency signal 148 to a first digital counter 150. The frequency of signal 148 is chosen as the product of the scan frequency of camera 26 (FIG. 1) multiplied by desired number of horizontal graduations in each correlation map multiplied by the number of correlation maps in each row of the correlation plane 28. If it is desired to adjust this frequency, for example to substitute the correlation imagery for another set of correlation imagery having a different arrangement of correlation maps, oscillator circuit 146 may include appropriate logic for scaling the frequency of output 148 according to an input $N_C$ indicating the number of columns of maps in the correlation plane. $N_C$ may be set manually or supplied by automatic control means described later herein.

Counter 150 counts oscillations in the horizontal data frequency signal 148 and resets each time a count corresponding to the desired number of horizontal graduations in each correlation map is reached. Output 152 of counter 150 is preferably an eight-bit parallel digital signal which increases from 1 to 100 (or some other suitable number of horizontal graduations in each correlation map) as the scan spot moves from left to right across each correlation map. While the horizontal position signal 46 may be taken directly from counter 150, this will result in an offset error in the horizontal location stored for each video peak, since the count may advance one or more times during the falling slope portion of the peak and the time required by A/D converter 134 to digitize the peak amplitude. This error may be compensated by subtracting a number of counts roughly equal to half the bandwidth $T_{BW}$ plus the A/D conversion period. Alternatively, a peak-horizontal position register 153 triggered by differentiated video signal 85 may be used to hold the peak position an appropriate number of counts until the write enable signal is pulsed. The function of register 153, then, parallels that of sample/hold 135.

The vertical position signal 48 is taken from an output of a second digital counter 154 which counts the horizontal lines scanned by camera 26 as indicated by horizontal sync 32 and resets each time a count corresponding to a desired number of horizontal lines in each correlation map is reached. Preferably the available horizontal lines in the scan roster are divided equally among each row of correlation maps, and signal 48 is preferably an eight bit parallel dititäl signal which increases as the horizontal scan lines moves from top to bottom down each correlation map. Just as VCO 146 may be adjusted for a change in the number of columns, a signal $N_R$ indicating the number of rows of correlation maps may be set manually or provided by automatic control means to appropriate logic to change the reset count of counter 154.

The resets by counters 150 and 154 are counted, respectively, by third and fourth digital counters 158 and 160, as indicated by reset signals 162 and 164. Counter 158 resets each time a count corresponding to the number of columns of correlation maps is reached, while counter 160 resets accordingly with the number of rows. Provision for changing the number of columns may be made by appropriate logic in counter 158 connected to $N_C$, while $N_R$ may be connected to appropriate logic in counter 160 to allow changes in the number of rows.

As shown in FIG. 4, counters 158 and 160 supply two four-bit parallel outputs 166 and 167 which indicate, respectively, the column number and row number of correlation map being scanned. Outputs 166 and 167 are combined, in parallel, to provide a scan address signal 168 which is connected to address bus 54 by an address gate 169 during correlation scanning periods as indicated by gated vertical blanking signal 33.

A sequencer circuit 170 produces a search address signal 171 which rapidly cycles through the correlation map addresses, such that all the addresses may be accessed during a single vertical blanking period, when triggered by signal 33. The search address signal 171 is gated to address bus 54 during blanking periods after each TV frame as indicated by signal 33.

The remaining circuitry of block 45 insures that outputs 46, 48 and 54 remain synchronized with horizontal sync signal 32. A phase comparator 172 forms a phase locked loop with VCO 146, counters 150 and 158, and a clocked delay circuit 174 and a divide-by-two flip-flop 176. A reset signal 178 from counter 158 should correspond to the horizontal line frequency of camera 26, and is used in conjunction with phase comparator 172 to provide a voltage control feedback signal 180 for VCO 146.

In practice it has been observed that the reset pulse width on signal 178 from column counter 158 is much shorter than that of the blanking pulse on horizontal sync 32. Thus, to ensure proper operation of phase comparator 172, clocked delay circuit 174, triggered by reset 178, generates a horizontal sync feedback signal 181 in which the pulses are sustained for an appropriate number of oscillations from VCO 146 to match the TV horizontal blanking period. Because counter 150 will continue to count during the horizontal blanking periods, it is necessary to provide an override reset input 182 to reset the horizontal data count at the end of the blanking period as the TV camera begins to scan a new line.

Again, in practice, variations among different TV cameras and monitors with which the present invention might be used may make necessary the provision of a border along the left and right edges of the correlation plane scan field to prevent truncation of the maps on either side. A right edge border may be implemented by arranging the clocked delay circuit 174 to delay the pulse on feedback sync 181 by an appropriate count, while the left edge border can be realized by having delay circuit 174 generate a separate reset signal to be connected to reset input 182 of horizontal counter 150 in place of signal 32. This signal would, of course, be pulsed an appropriate count after the feedback sync pulse on signal 181.

Analogously with reset 182 on counter 150, line counter 154 includes an override reset 183 which is connected to the ungated blanking pulse 34, so that the line count or vertical location 48 will be synchronized with the first scan line in each scan field. In order to provide correct line counts when interlaced fields are used, the reset count of counter 150 should be set at half the number of scan lines in each row of correlation maps. Then the counter output may be shifted left by one bit, and the least significant bit in output 48 added, as by a flip-flop set and reset by signal 34, to indicate the odd or even line field.

Horizontal sync signal 32 and internal line frequency signal 181 are each converted to 50% duty cycles by divide-by-two flip-flops 184 and 176. By comparing the phase difference between the outputs from flip-flops 184 and 176, phase comparator 172 supplies the feedback signal 180 which corrects the timing of oscillator 146.

Figure 5:
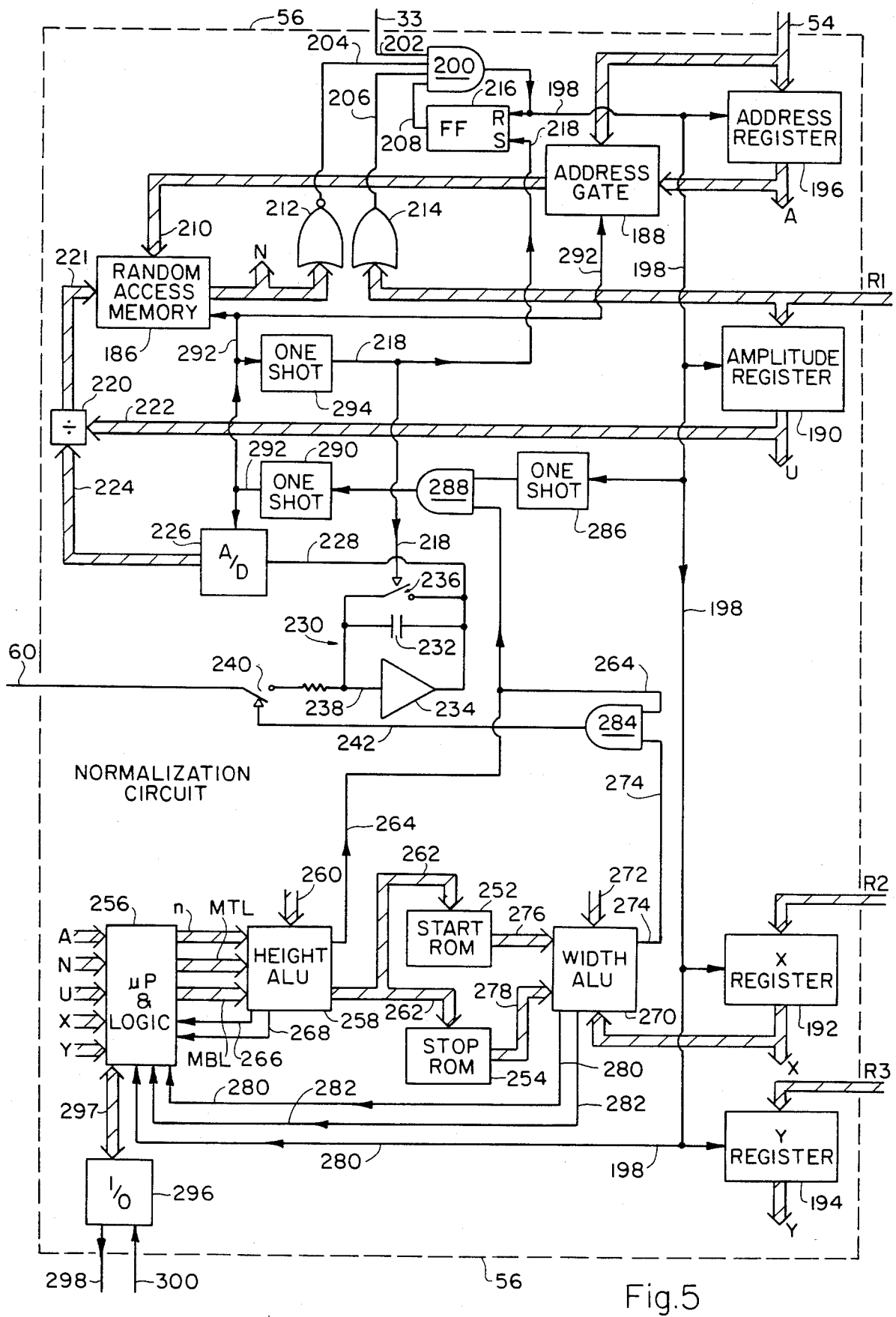

Turning now to FIG. 5, the details of normalization circuitry block 56 of FIG. 2 are shown. The object of normalization circuitry 56 is to obtain a quotient of the amplitude of each video peak from the correlation plane 28 divided by the image energy from a relevant area in the input scene. Each such quotient or normalized video peak is stored in a RAM 186 which is addressed in parallel with RAM's 42, 50 and 52 (FIG. 2) by means of an address gate 188 having an input connected to address bus 54. By parallel addressing, it will be understood that each normalized peak in RAM 186 will have an identical memory address as the corresponding unnormalized peak in RAM 42, etc.

In order to allow sufficient time for circuitry 56 to operate, the RAM outputs R1, R2 and R3 are connected, respectively, to storage registers 190, 192 and 194. Similarly, address bus 54 is connected to a storage register 196. A window gate trigger signal 198 enables the data on address bus 54 and RAM outputs R1, R2 and R3 to be stored in their respective registers.

An AND gate 200 having four inputs 202, 204, 206 and 208 is used to derive signal 198. Input 202 is connected to the gated vertical blanking signal 33; thus, the storage registers will be enabled only during the blanking periods when address bus 54 is connected to the search address signal 171 (FIG. 4).

So that each memory location is RAM 186 may be examined to determine whether a normalized peak value has been stored, address bus 54 is connected to address input 210 by address gate 188 during the blanking or search period. The data output N of RAM 186 is connected to an eight-input NOR gate 212 whose output is in turn connected to the second input 204 of AND gate 200. Thus, input 204 will be a logical one if and only if RAM 186 output N consists of eight logical zeros, signifying that no data has been stored at the currently addressed location in RAM 186.

Similarly, RAM output R1, representing the data in the unnormalized peak RAM 42 at the address on bus 54, is connected to an OR gate 214. The output of gate 214, connected to input 206 of gate 200, will thus be a logical one when a video peak amplitude has been stored in RAM 42 at the address on bus 54, and a logical zero if no peak has been stored (i.e., R1 is all zeros).

The fourth input 208 of AND gate 200 is connected to the output of a lock-out flip-flop 216 which is preferably of the set-reset (SR) type. The reset input of flip-flop 216 is connected to the output of AND gate 200. As a result the window gate trigger signal 198 output by gate 200 is held low until the newly stored information in registers 190, 192, 194 and 196 has been processed and a normalized peak amplitude stored in RAM 186. This event is indicated by a pulse on an intergrator clear signal 218, connected to the set input of flip-flop 216.

The amplitude of an unnormalized peak from the correlation plane 28, stored in amplitude register 190, divided by the image energy of the relevant area in the input scene 59 is calculated by a hard-wired digital divider 220. In practice, divider 220 may be a digital multiplier having one input coupled through a reciprocal look-up ROM. The output of divider 220 is connected to input 221 of RAM 186, and the numerator input 222 is, of course, connected to the output of register 190. The denominator input 224 of divider 220 is taken from the output of an analog-to-digital converter 226 having an analog input 228 connected to the output of a voltage integrator circuit 230.

Integrator 230 may be constructed by placing a feedback capacitor 232 in parallel with an operational amplifier 234. An integrator clear switch 236 activated by a pulse on the integrator clear signal 218 serves to clear the integrator 230 by discharging capacitor 232.

The input of integrator 230 is connected to a masked video signal 238 which replicates the video input signal 60 when the relevant area in the input scene whose image energy is to be measured is being scanned. Signal 238 is derived by means of an integrator enable switch 240 activated by an integrator enable signal 242. Thus, when signal 242 is high, the masked video signal 238 is connected to video input signal 60; otherwise, signal 238 has a value of zero.

Figure 6:
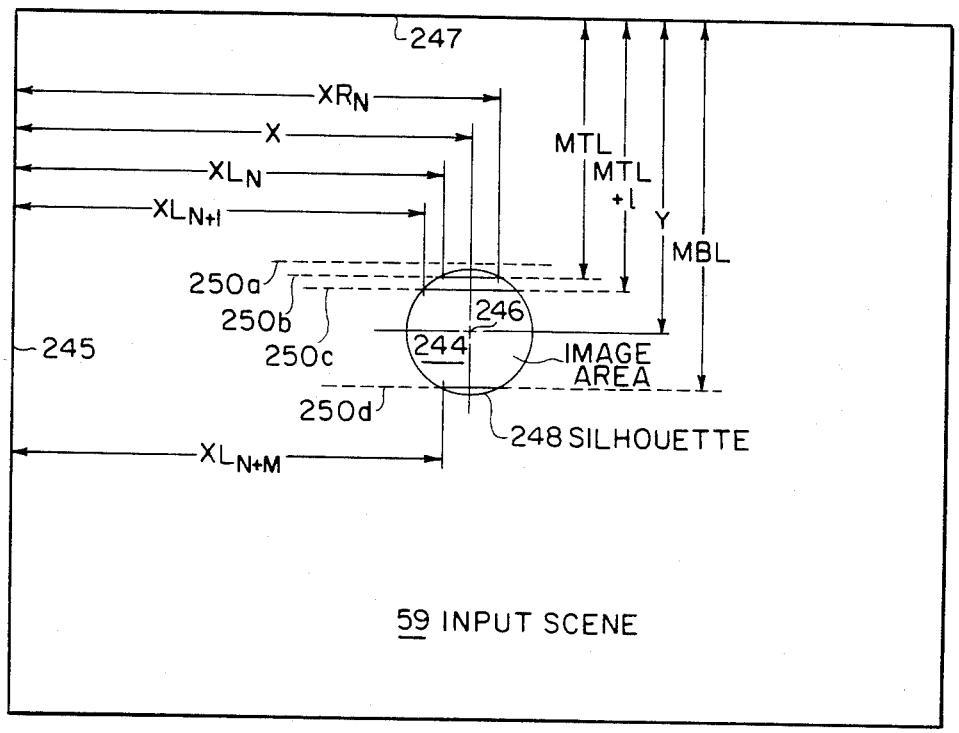

The remaining circuitry of block 56 may be better understood by reference to FIG. 6, illustrating a typical area 244 in the input scene 59 whose image energy is to be integrated.

Each time gate 200 pulses the window gate trigger signal 198, the appropriate area in the input scene will be integrated. Preferably, the matched filters in system 25 are fabricated with the known object for each filter centered in the object recording beam. Thus, the location of center 246 of area 244 in the input scene 59 is determinable from data outputs X and Y of storage registers 192 and 194. As seen in FIG. 6, data output X represents the horizontal distance (i.e., the data frequency count) from the left edge 245 of input scene 59 to center 246. Similarly, data output Y gives the vertical distance (or horizontal scan line count) to point 246 from the top edge 247 of the input scene.

It is well known that most of the image energy in a typical area of an input scene resides in the relatively large patches of light, represented by the lower spatial frequencies on the matched filters. It has also been observed, however, that the higher spatial frequencies representing fine lines and small details of an object are a more useful discriminant for purposes of recognition. Thus, in order to enhance the high frequencies while preventing saturation of the video signal, it is preferable to modify the input scene before it is viewed by match filters 25 or camera 58 by passing it through a high-pass filter, so that the image energy is concentrated in fine lines and small patches of light, while larger patches are attenuated or darkened. The image is filtered through a high frequency optical filter with the same bandwidth of the optical match filter.

If the known objects represented in system 25 occupy approximately equal areas, a uniformly shaped integration area, such as a rectangular window, could be used for all the matched filters. Such a window would be acceptable for input scenes with widely spaced objects and little background light. However, the enhancement of fine detail can leave fine bright background detail between an object in the input scene and the edges of a uniform window which will contribute a non-negligible increase in measured image energy. In a preferred embodiment, therefore, for each matched filter in system 25, an integration window having the same shape as the silhouette of the known object represented by the filter is provided.

In FIG. 6, a circular window 248, consistant with the silhouettes of the known objects such as the circular objects depicted in FIG.'s 8a and 8b, encloses the area 244 about point 246. Of course, differently shaped known objects would require correspondingly shaped integration windows. Lines 250 a, b, c, and d represent, not to scale, several horizontal scan lines passing through the area about point 246. The dashed portions of the scan lines represent areas where no image energy is to be collected, while the integrator 230 is to be enabled by signal 242 when the input scene scan spot traverses the solid portion of lines 250 b, c and d.

For any given known object silhouette and vertical location Y a maximum top line (MTL) and a minimum bottom line (MBL) may be computed for the area in the input scene to be integrated. Thus, MTL in FIG. 6 represents the line count of the first horizontal scan line, 250 b, to pass through silhouette 248, and MBL is the line count of the last scan line cutting the integration area 244. Since the scan line count increases from the top to the bottom of the input scene, the number of scan lines cutting area 244 is given by (MBL-MTL+1) or, letting m equal (MBL-MTL), (m+1).

The exact shape of silhouette 248, then, may be represented as (m+1) start/stop pairs of horizontal data frequency counts—$XL_{MTL}/XR_{MTL}$; $XL_{MTL+1}/XR_{MTL+1}$; etc.—where the input scene scan spot first enters and last leaves the integration area 244 while traversing each of the (m+1) scan lines which pass through area 244. The start/stop counts may be computed given the horizontal location X of an integration area, jut as MTL and MBL are derived from the vertical location Y, for any known silhouette shape. Shown in FIG. 6 are the data counts $XL_{MTL}$ and $XR_{MTL}$ where the input scene scan spot enters and leaves area 244 along scan line 250b; and data counts $XL_{MTL+1}$ and $XL_{MBL}$ where the scan spot enters area 244 on lines 250 c and d respectively.

It will be observed that the values of MTL; MBL; $XR_{MTL}$; $XL_{MTL}$; etc. for a given integration window will depend not only on the shape and size of the silhouette, but also on the X/Y location of the associated correlation spot in its correlation map. However, since the silhouette represents a known object, a standardized set of start/stop counts may be calculated a priori with reference to some arbitrary horizontal location. These standard horizontal data counts may then be stored, in digital format, at consecutive addresses in parallel addressed read-only memories (ROM's). Thus, in FIG. 5, the start counts are stored in a start ROM 252, and the stop counts in stop ROM 254. Preferably, ROM's 252 and 254 should include sufficient storage space for silhouettes representing all of the known objects whose diffraction patterns are contained in matched filter system 25. It is anticipated that two commercially available 8K ROM's will be sufficient for this purpose.

From the foregoing discussion, it should be evident that each correlation map is to be associated with a particular silhouette, which may thus be identified from the map address stored in register 196. Because ROM's 252 and 254 are addressed in parallel, the silhouette associated with a given map address may be accessed by a single ROM starting address n. That is, for a silhouette represented by (m+1) start/stop data counts, the start counts will be found at addresses n through (n+m) in ROM 252, and the stop counts at the same addresses in ROM 254.

Computation of MTL, MBL, and n from storage register outputs Y and A may be performed during the alternate blanking periods as indicated by signal 33, preferably by an appropriately programmed microprocessor 256. MTL, MBL and n are supplied in parallel by microprocessor 256 to a height gate arithmetic logic unit (ALU) 258.

While ROM starting address n may be obtained directly from a look-up table keyed to the correlation map addresses, the derivatives of MTL and MBL each require an arithmetic operation with vertical location Y. If microprocessor 256 is incapable of performing these operations during the blanking period, the Y-offset values (i.e., the number of scan lines from Y to the top and bottom, respectively, of the silhouette) may be stored in the look-up table with the ROM starting addresses. Under this alternate scheme, then, the Y-offset values as well as output Y from register 194 would be provided to appropriate hard-wired arithmetic logic in ALU 258 to derive MTL and MBL as the input scene is scanned.

Also received as an input by ALU 258 is a signal 260 indicating the horizontal scan line count of the input scene scanner. The source of signal 260 will depend on the particular means chosen to scan the input scene. If one of the correlation maps devoted to the input scene by substituting a high-pass filter for one of the matched filters in system 25, the line count for the input scene scan may be taken from signal 48 in addressing circuitry 45. Appropriate logic connected to address bus 54 would indicate when the correlation map representing the input scene is being scanned.

If, on the other hand, a second separate scanning means, such as camera 58 in FIG. 2, is used to scan the input scene 59, other means must be employed to generate signal 260. If cameras 26 and 58 are operated synchronously, the line count in the input scene corresponding to a line count in any correlation map may be derived by connecting another counter to horizontal sync 32 and appropriately scaling its output. Otherwise, if the cameras are not synchronous, the additional counter may be connected to the horizontal sync signal of camera 58, again with appropriate scaling logic to relate the number of input scene scan lines to the number of correlation map lines.

ALU 258 outputs an address signal 262 to ROM's 252 and 254 by adding (n-MTL) to the line count signal 260.

ALU 258 also produces a height gate signal 264 which indicates that the line count indicated by signal 260 is between MTL and MBL inclusive, i.e., that the current input scene scan line passes through area 244. Signal 264 may be taken, for example, from the output of a two-input AND gate having one input supplied by a digital comparator whose positive input is connected to MTL and whose negative input is taken from line count signal 260, the other AND gate input being connected to a digital comparator whose positive and negative inputs are connected, respectively, to signal 260 and MBL.

Additional outputs 266 and 268 by ALU 258 to microprocessor 256 may indicate, respectively, whether MTL is less than zero or MBL is greater than the number of lines in input scene scan raster. These signals may be used to abort the normalization, since they would indicate that the input scene object is partially off the top or bottom of the TV raster and that only a portion of the objects image energy is available for integration.

A width gate ALU 270 analyzes the data graduation count in each input scene scan line in much the same fashion that ALU 258 processes the line count 260. An input scene horizontal location signal 272 indicates the horizontal data frequency count from the left edge of the input scene 59, appropriately scaled to correspond to the number of horizontal graduations in each correlation map. As with line count signal 260, the horizontal location signal 272 may be taken directly from signal 46 (FIG. 4) if a single camera is used; by an appropriately scaled counter connected to signal 148 if synchronized cameras are used; or by means of a separate appropriately scaled oscillator and counter if two unsynchronized cameras are employed.

A line gate signal 274 output by ALU 270 indicates when the scan spot, while traversing a line which cuts through area 244, is actually within the integration area 244. Appropriate arithmetic logic in ALU 270 produces start and stop signals by offsetting the standarized left edge or start count 276 from start ROM 252 and the centered right edge or stop count 278 from ROM 254 as indicated by the output X from horizontal location register 192. Line gate signal 274, then, may be derived by means of an AND gate and digital comparators configured similarly to those supplying height gate signal 264, but utilizing start count 276, stop count 278 and data count signal 272 in place of MTL, MBL and line count signal 260 respectively.

Analogous to outputs 266 and 268 from ALU 258 are outputs 280 and 282 from ALU 270 indicating, respectively whether start signal 276 is less than zero (i.e., whether the object is partially off the left edge); and whether stop count 278 is greater than the number of horizontal data graduations in each correlation map (i.e., whether the object is partially off the right edge of the input scene). As with signals 266 and 268, the off-edge signals from ALU 270 may be supplied to microprocessor 256 or used to abort the normalization.

The height gate signal 264 and the line gate signal 274 are combined by a logical AND gate 284 to derive the integrator enable signal 242. The window gate pulse on signal 198 is delayed by a period of one TV field by an appropriately timed one-shot 286 and combined with the height gate signal 264 by a logical AND gate 288. The output of gate 288 is in turn delayed a sufficient period of time by a one-shot 290 to allow completion of the scanning of area 244 in the input scene. A normalization enable signal 292 is output by one-shot 290, and is used to enable A/D 226, switch the output of address gate 188 from address bus 54 to data output A from register 196, and to enable the input 221 to be read into the address on input 210 of RAM 186. Signal 292 is in turn delayed a sufficient period to allow conversion of the analog input 228 by A/D 226 for digital divider 220 and subsequent storage of a new normalized correlation in RAM 186 by one-shot 294. The integrator clear signal 218 output by one-shot 294 clears integrator 230 and sets lock-out flip-flop 216 for the next normalization.

In addition to supplying signals n, MTL and MBL to height ALU 258, microprocessor 256 provides an interface between the operator and the correlation plane processor. Thus, data outputs A, U, N, X and Y are supplied to microprocessor 256, through appropriate logic, converted to a suitable format and supplied, in turn, to an input/output buffer (I/O) 296, as by bi-directional bus 297. An output 298 from I/O 296 drives display means, such as CRT 62 (FIG. 2), while an input 300 to I/O 296 supplies suitably encoded, as by a teletype keyboard, parameters governing the operation of the various elements of the correlation plane processor. A desired display may incorporate a replica of the input scene identifying recognized objects according to their normalized correlations. The normalized amplitude N, representing a confidence indicator of the match between the input scene object and the object represented by one of the matched filters, may be displayed as a number at the request of the user, for instance, or by a blinking rate of the object on the input scene replica, etc.

Besides supplying an interface for the display system, micro-processor 256 serves as an automatic means for controlling the criteria used to distinguish auto correlations from cross correlations. Thus the threshold voltages $V_a$, $V_r$ and $V_f$, as well as bandwidth adjusting voltage BW (FIG. 3) may be taken from digital-to-analog (D/A) converters whose inputs are in turn supplied by suitable logic associated with microprocessor 256. Desired distinction criteria may be stored in appropriate memories associated with microprocessor 256, or an interactive mode may be implemented, in which the operator encodes the desired criteria and communicates same to the system through I/O 296. Similarly, the column count $N_C$ and row count $N_R$ may be encoded by microprocessor 256 and supplied to addressing circuitry 45 in either a passive or interactive mode.

Figure 7:
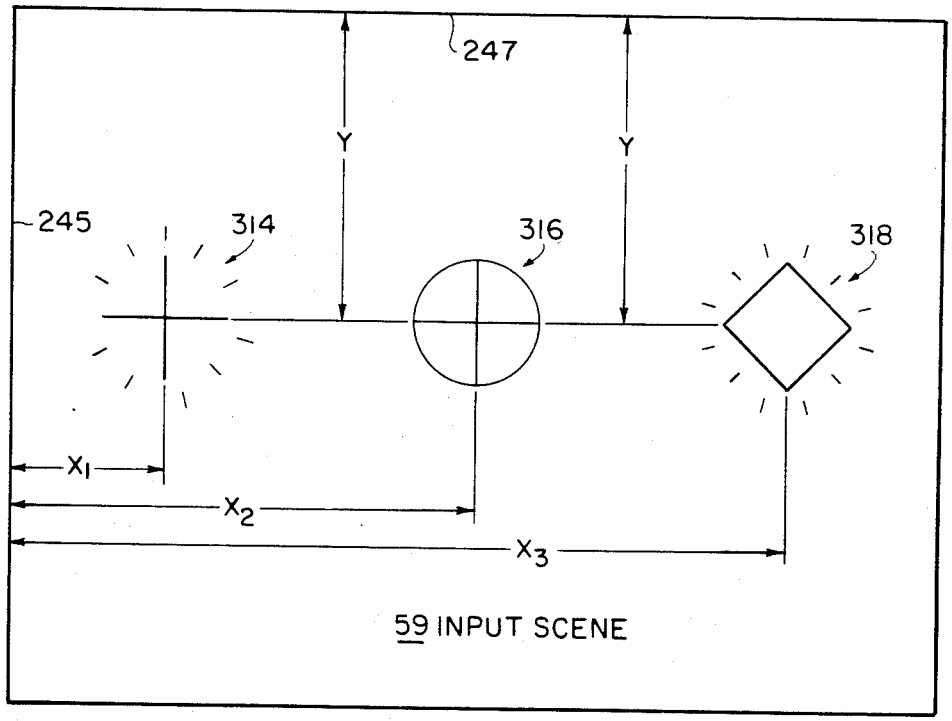
Figure 8A:
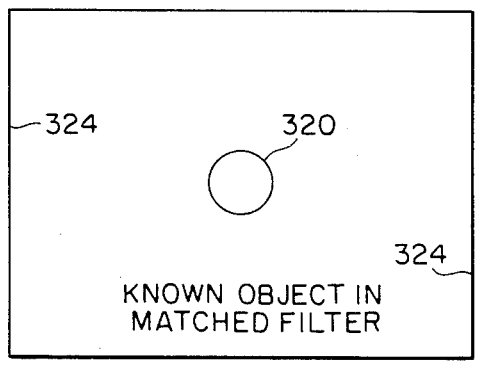
Figure 8B:
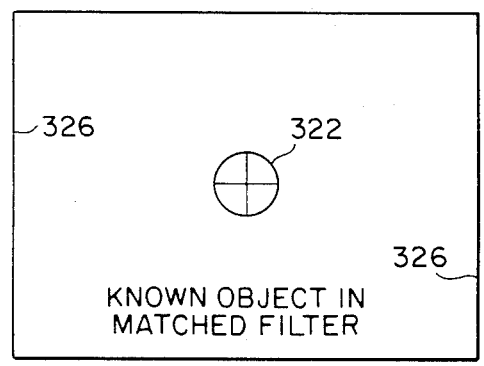

The exemplary input scene of FIG. 7, known objects of FIGS. 8a and 8b, and correlation maps and exemplary signals of FIGS. 9a and 9b illustrate the operation of the correlation plane processor of the present invention.

For purposes of illustration, an input scene 59 comprising three objects 314, 316 and 318 centered on the same horizontal scan line is shown in FIG. 7. Thus, object 314 is centered a horizontal distance $X_1$, from left edge 245 and a vertical distance Y from top edge 247; object 316 at $X_2$ from edge 245 and Y from edge 247; and object 318 at $X_3$ from edge 245 and Y from edge 247. The marks surrounding objects 314 and 318 indicate their relative brightness as compared with object 316. Only fine lines appear in input scene 59, since the low spatial frequencies are filtered out.

Each of these objects will produce a correlation spot at its corresponding location in each correlation map in correlation plane 28. FIGS. 8a and 8b show examples of known objects 320 and 322 which may be recorded on matched filters in system 25. Borders 324 and 326 show the relative size of objects 320 and 322 as they might appear in input scene 59; and, further, illustrate the centered position of the objects in an input image (object beam) which is used to fabricate the matched filters.

A portion of correlation plane 28 showing two adjacent (same row) correlation maps 328 and 330 is depicted in FIG. 9a. Map 328 represents the output of the matched filter of known object 320 of FIG. 8a when presented with input scene 59 of FIG. 7, while map 330 is the output of the matched filter of object 322 of FIG. 8b and the input scene. Included in map 328 are correlation spots 332, 334 and 336, while spots 338, 340 and 342 fall within map 330. Spot 332 represents the correlation of the diffraction pattern of object 314 with that of known object 320; spot 334, the correlation of the diffraction pattern of object 316 with that of known object 320; etc. The locations of spots 332, 334, etc. in their respective maps 328 and 330 is given by the corresponding location, proportionally adjusted if necessary as explained above, of objects 314, 316 and 318 in input scene 59.

As will be appreciated by one skilled in the art, an autocorrelation, that is, a correlation between identical patterns, will produce a small, bright spot. Conversely, cross-correlation spots will be blurred and spread out. Nevertheless, a very bright object in input scene 59 may produce brighter cross-correlation spots than autocorrelation spots from dimmer input objects. The present invention uses a number of discriminators to detect autocorrelation spots, i.e., to distinguish autocorrelations from cross-correlations. FIG. 9b shows several time varying signals resulting as the scan spot of camera 26 (FIG. 2) moves across correlation plane 28 along a horizontal line 344 which cuts through the center of spots 332, 334, etc. The voltage and logic levels of the various signals are shown on the ordinate of FIG. 9b, while the abcissa represents time. As depicted, $t_{346}$ represents the time when the correlation plane scan spot passes the left border 346 of map 328; $t_{348}$ to the time when the scan spot crosses the border 348 between maps 328 and 330, and $t_{350}$ to the time when right border 350 of map 330 is crossed.

Signal 30, the video signal, is shown superimposed on amplitude threshold voltage $V_a$. Included in video signal 30 are video peaks 352, 354, 356, 358, 360 and 362 corresponding to correlation spots 332, 334, 336, 338, 340 and 342 respectively. As shown in FIG. 9b, signal 30 exceeds $V_a$ in the time intervals between times $t_a$ resulting in a logical one output 70 by comparator 64 during these intervals. Since peak 354 does not exceed voltage $V_a$ there is no corresponding pulse on output 70.

Similarly to signal 30 and voltage $V_a$ are shown, superimposed, differentiated video signal 85 and rising slope threshold voltage $V_r$ (the inputs to comparator 72). The resulting output 84 of comparator 72 is a logical one in the intervals between times $t_r$ when signal 85 exceeds voltage $V_r$. No pulse on signal 84 appears corresponding to peak 352, since the peak's rising slope does not exceed the rising slope threshold dictated by $V_r$.

Also superimposed on differentiated video signal 85 is ground level 80, to show times $t_p$ when the slope of the video signal changes from positive to negative. At these times, the output 139 from sample and hold circuit 135, shown with video signal 30, changes levels, thus indicating the peak value or amplitude of each video peak 352, 354, etc.

Threshold 90 start signal from AND gate 92 includes pulses in the intervals when both outputs 70 and 84 are high, indicating the start of a video pulse having appropriate amplitude and rising slope. Each of the pulses from gate 92 is converted to a pulse of uniform duration or width $T_{BW}$, determined by input voltage BW to one shot 100, as shown in threshold detection signal 98. As pointed out earlier, the pulse width of each pulse in threshold detection signal 98 is related to the high frequency spatial bandwidth of the matched filters.

Analogous to the output 84 from rising slope comparator 72, signal 108 from comparator 102 indicates periods of appropriate falling slope. Thus, signal 108 is a logical one during the intervals between times $t_f$ when the differentiated video signal 85 falls below falling slope threshold voltage $V_f$ shown superimposed on signal 85. No pulse on signal 108 appears corresponding to peak 356 since its falling slope does not meet the threshold of $V_f$.

Peak detection pulse 132 output by AND gate 122 includes pulses only when there is a concurrence between threshold detection signal 98 and falling slope comparator output 108. Thus, only peaks 360 and 362 of FIG. 9b are accepted as video peaks, as indicated by their corresponding pulses on signal 132. Peak 352, although having sufficient amplitude, is rejected because its rising slope is insufficient to trigger comparator 72. Peak 354, while having acceptable rising and falling slopes, is rejected because of insufficient amplitude. Peak 356, while having sufficient amplitude and rising slope to generate a pulse in threshold detection signal 98, does not fall off rapidly enough to trigger comparator 102, and is therefore, rejected as having insufficient falling slope. Peak 358 is rejected as too wide—although it meets the rising slope and amplitude threshold and produces a pulse on signal 98, and has sufficient falling slope to produce a pulse on signal 108, the period between the threshold and falling slope exceeds the allowable bandwidth $T_{BW}$, resulting in rejection of the peak.

From the foregoing discussion it will be appreciated that the shape of video peaks accepted by pre-processing circuitry 35 is determined by the particular values chosen for $V_a$, $V_r$, $V_f$ and $T_{BW}$. By appropriate adjustment of these parameters, most of the video peaks resulting from cross-correlations rather than auto-correlation can be filtered out, leaving normalization circuitry 56 to analyze the remaining correlation peaks.

Shown below peak detection signal 132 in FIG. 9b is write enable signal 44 from digital comparator 40 (FIG. 2). Each time a pulse appears on peak detection signal 132, A/D converter 134 (FIG. 3) transmits a new digital value, corresponding to the latest video peak maximum amplitude from sample and hold circuit 135, to comparator 40. Meanwhile the other input to comparator 40 looks at the value stored in amplitude RAM 42 at the address (on bus 54) corresponding to the particular correlation map being scanned. If the newly digitized peak is greater in value than whatever was previously stored at the same map address, comparator 40 outputs a pulse on write enable signal 44, enabling the digitized amplitude, X location (horizontal data frequency count 46) and Y location (line count 48) of the new, larger video peak to be stored in place of the previously stored information in RAM's 42, 50 and 52 for the particular correlation map address on address bus 54.

In practice, there will be delay $T_{AD}$ between the beginning of the peak detection pulse on signal 132 and a write enable pulse on signal 44 corresponding to the time required by A/D converter 134 to digitize the new peak amplitude. Also, in practice, the holding period of sample/hold 135 need not extend to the next video peak as depicted in FIG. 9b but only as long as necessary for the digital peak amplitude to be computed.

Normalization circuitry 56 supplements the amplitude, rising slope and pulse width screening criteria of video peaks implemented by pre-processing circuitry 35 by supplying normalized amplitudes for each maximum detected video peak stored in RAM's 42, 50 and 52. As will be understood by those skilled in the art, the correlation spots produced by the first order conjugate beam of an optical matched filter system such as that disclosed in U.S. Pat. No. 3,779,492 will include all of the image energy of a matched object in the input scene concentrated at a single point in the correlation plane. Thus, for matched objects, the amplitude of a correlation spot, or video peak, may be equated to the light energy in the input scene within an appropriately shape window superimposed over the object. When an unmatched object produces a cross-correlation spot, the amplitude of such a spot will be less than the image energy of the corresponding input scene object. By obtaining the quotient of a video peak amplitude divided by the associated input scene energy—that is, by normalizing each video peak, a confidence indicator as to the closeness of the match between the input scene object and each known object represented in the matched filter system is produced. Normalized amplitudes close to unity would be recognized as matched objects (autocorrelations), while lower or higher normalized amplitudes would be interpreted as poorly matched objects (cross-correlations).

In a single TV frame, the amplitude and location of one video peak for each correlation map (if any are detected in that map) is stored in digital form. For a non-stationary (e.g., real time) input scene, storage RAM's 42, 50 and 52 are preferably cleared after each TV frame to be updated during the succeeding frame. Once a pre-processed peak is selected for normalization, its amplitude and location are latched in registers 190, 192 and 194, and the normalized amplitude is stored in RAM 186.

Of course, it may be desired to obtain normalized amplitudes for more than one correlation in each correlation map. To implement such a feature, the location of each normalized peak might be stored in a separate memory by microprocessor 256. Appropriate logic between such a memory and address circuit 45 could then be used to inhibit the write enable signal for any detected peak already normalized. The inhibit logic should account for the fact that a single correlation spot may produce a detectable video peak on each of several successive scan lines which pass through the spot.

On the first gated vertical blanking period after all the maximum video peaks have been normalized, then, NOR gate 212 will hold the window gate trigger signal 198 low. This event may be sensed, for example, by appropriate logic associated with microprocessor 256 which can in turn clear RAM 186. The inhibit memory and logic just described would then allow the next largest detected peak in each correlation map to be normalized. When two successive gated vertical blanking pulses pass with no change in signal 198, all the detected correlations will have been normalized and microprocessor 256 may then clear the inhibit memory. In this way the normalized information supplied to display means 62 will be updated to reflect any movement of the recognized objects in the input scene.

From the foregoing description of the present invention it will be appreciated that pre-processing circuitry 35 can filter out most of the cross correlations, and that normalization circuitry 56 can supply up to 30 normalized amplitudes per second. It is anticipated that the described embodiment will successfully track a reasonable number (e.g., up to 20) of input scene objects through a large number of optical matched filters (e.g., up to 100 filters arranged to provide 10 rows and 10 columns of maps in the correlation plane). If, however, a very large number of input scene objects are moving too quickly to be tracked through all the available filters, provision may be made to allow the operator to select one or more filters whose outputs will be normalized. This may be accomplished, for instance, by adjusting sequencer 170 to output only the addresses of the selected correlation maps (i.e., matched filters). A simpler alternative would be to clear RAM 186 at more frequent intervals, before the maximum peaks in maps having later sequenced addresses are normalized. Other schemes for maximizing tracking frequency will be obvious to those of skill in the art. Of course, improved tracking capability may also be obtained by using faster scanners or by employing multiple input scene scanners to perform simultaneous normalizations.

Various modifications of the present invention will be apparent. For example, the silhouette storage RAM's maybe augmented by a second pair of parallel addressed RAM's if it is desired to represent a silhouette in which any single scan lines enter and exit the integration window more than once. Also various scanning means other than a TV camera, such as a photodiode array, may be employed. Still other modifications which will suggest themselves to those of skill in the art may be utilized without departing from the spirit of the present invention.

For this reason, it will be understood that the foregoing descriptions are presented by way of example only, and the scope of the present invention is limited only by the appended claims.

What is claimed is:

1. An optical matched filter system comprising:
   a plurality of memorized diffraction patterns of known objects;
   means for obtaining a diffraction pattern of an input scene;
   means for combining the diffraction pattern of the input scene with the memorized diffraction patterns to obtain correlation imagery including a plurality of non-overlapping correlation maps arranged in a regular geometric array in a correlation plane, each correlation map representing a product of one of the memorized diffraction patterns and the diffraction pattern of the input scene;
   means for scanning the correlation plane to produce a video signal in proportion to a light intensity at a scan spot in the correlation plane;
   means for detecting pulses in the video signal corresponding to correlation spots in the correlation imagery;
   a first comparator circuit having one input connected to the video signal and another input connected to a desired amplitude threshold voltage, such that an output of said first comparator circuit indicates when the amplitude of the video signal exceeds the desired amplitude threshold voltage;
   means for deriving a differentiated video signal;
   a second comparator circuit having one input connected the differentiated video signal and another input connected to a rising slope threshold voltage proportional to a desired rising slope threshold, such that an output of said second comparator circuit indicates when the amplitude of the video signal is increasing at a rate in excess of the desired rising slope threshold;
   a first logic gate having inputs connected to the outputs of the first and second comparator circuits and outputting a threshold start signal indicating the beginning of a video pulse;
   a one-shot circuit having an input connected to the threshold start signal and outputting a threshold detection signal in which a threshold pulse indicates the detection of a video pulse having values within the desired ranges of amplitude and rising slope, the duration of the threshold pulse corresponding to a desired bandwidth of the memorized diffraction patterns;
   a third comparator circuit having one input connected to the differentiated video signal and another input connected to a falling slope threshold voltage proportional to a desired falling slope threshold such that the third comparator circuit outputs a falling slope threshold signal indicating when the amplitude of the video signal is decreasing faster than the desired falling slope threshold; and
   a second logic gate having inputs connected to the threshold detection signal and the falling slope threshold signal and outputting a peak detection signal.

2. An optical matched filter system comprising:
   a plurality of memorized diffraction patterns of known objects;
   means for obtaining a diffraction pattern of an input scene;
   means for combining the diffraction pattern of the input scene with the memorized diffraction patterns to obtain correlation imagery including a plurality of non-overlapping correlation maps arranged in a regular geometric array in a correlation plane, each correlation map representing a product of one of the memorized diffraction patterns and the diffraction pattern of the input scene;
   means for scanning the correlation plane to produce a video input signal in proportion to the light intensity at a scan spot in the correlation plane;
   means for detecting pulses in the video signal corresponding to correlation spots in the correlation imagery; and
   means for memorizing an amplitude and location in the correlation plane of no more than one maximum amplitude detected video pulse for each correlation map each time the correlation plane is scanned.

3. An optical matched filter system comprising:
   a plurality of memorized diffraction patterns of known objects;
   means for obtaining a diffraction pattern of an input scene;
   means for combining the diffraction pattern of the input scene with the memorized diffraction patterns to obtain correlation imagery including a plurality of non-overlapping correlation maps arranged in a regular geometric array in a correlation plane, each correlation map representing a product of one of the memorized diffraction patterns and the diffraction pattern of the input scene;

means for scanning the correlation plane to produce a video input signal in proportion to the light intensity of a scan spot in the correlation plane;

means for detecting pulses in the video signal corresponding to correlation spots in the correlation imagery;

an analog-to-digital converter connected to the video signal and outputting a digital video signal;

a first random access memory having an address input, a data input enabled by a write input, and a data output, the data input of said first random access memory being connected to the digital video signal; and a digital comparator having inputs connected to the digital video signal and the data output of the first random access memory, and outputting a write enable signal indicating when the digital video signal is greater than the data output of the first random access memory, the write input of the first random access memory being connected to the write enable signal.

4. The system of claim 3 which further comprises:

an oscillator circuit which outputs a horizontal data frequency signal;

a first digital counter which counts oscillations in the horizontal data frequency signal and resets each time a count corresponding to a desired number of horizontal graduations in each correlation map is reached, such that an output of said first digital counter indicates a horizontal position of the scan spot in the correlation map being scanned;

a second random access memory having an address input, a data input enabled by a write input, and a data output, the data and write inputs of said second random access memory being connected, respectively, to the output of the first digital counter and the write enable signal;

a second digital counter which counts the horizontal lines scanned by the scanning means and resets each time a count corresponding to a desired number of horizontal lines in each correlation map is reached, such that an output of said second digital counter indicates a vertical position of the video signal in the correlation map being scanned; and a third random access memory having an address input, a data input enabled by a write input and a data output, the data and write inputs of said third random access memory being connected, respectively, to the output of the second digital counter and the write enable signal.

5. The system of claim 4 which further comprises:

a third digital counter which counts resets of the first digital counter and resets each time a count corresponding to a desired number of columns of correlation maps in the correlation plane is reached, such that an output of said third digital counter indicates a column number of the correlation map being scanned;

a fourth digital counter which counts resets of the second digital counter and resets each time a count corresponding to a desired number of rows of correlation maps in the correlation plane is reached, such that an output of said fourth digital counter indicates a row number of the correlation map being scanned; and an address bus having inputs connected to the outputs of the third and fourth digital counters and an output connected to the address inputs of the first, second and third random access memories.

6. An optical matched filter system comprising:

a plurality of memorized diffraction patterns of known objects;

means for obtaining a diffraction pattern of an input scene;

means for combining the diffraction pattern of the input scene with the memorized diffraction patterns to obtain correlation imagery including a plurality of non-overlapping correlation maps arranged in a regular geometric array in a correlation plane, each correlation map representing a product of one of the memorized diffraction patterns and the diffraction pattern of the input scene;

means for detecting correlation spots in the correlation imagery;

means for measuring image energy of each of a plurality of areas in the input scene, the locations of the areas in the input scene corresponding to the location of correlation spots in the respective correlation maps; and means for calculating a quotient of an amplitude of each correlation spot divided by the image energy of the associated area in the input scene whereby it may be determined whether each correlation spot is an autocorrelation spot.

7. The system of claim 6 in which the means for calculating quotients comprises a hard-wired digital divider.

8. An optical matched filter system comprising:

a plurality of memorized diffraction patterns of known objects;

means for obtaining a diffraction pattern of an input scene;

means for combining the diffraction pattern of the input scene with the memorized diffraction patterns to obtain correlation imagery including a plurality of non-overlapping correlation maps arranged in a regular geometric array in a correlation plane, each correlation map representing a product of one of the memorized diffraction patterns and the diffraction pattern of the input scene;

means for detecting correlation spots in the correlation imagery;

means for defining a plurality of areas in the input scene whose areas correspond to the locations of associated correlation spots in the correlation imagery, such that an image energy may be measured for each such area;

means for scanning the input scene to produce a video input signal in proportion to a light intensity at a scan spot in the input scene;

means for masking the video input signal such that a masked video signal output by said masking means replicates the video input signal when the area whose image energy is to be measured is being scanned, the masked video signal otherwise having a value of zero; and means for integrating the masked video signal.

9. The system of claim 8 in which the masking means comprises:

means for deriving a height gate signal indicating that the scan spot in the input scene is traversing a scan line which passes through the area whose image energy is to be measured;

means for deriving a line gate signal indicating when the scan spot, while traversing a scan line which passes throuh the area whose image energy is to be measured, is within said area;

means for combining the height gate signal and the line gate signal to form an integrator enable signal; and a switch activated by the integrator enable signal.

10. The system of claim 9 in which the means for deriving the height gate signal comprises:

means for calculating a maximum top line and a minimum bottom line for each area in the input scene whose image energy is to be measured; and a height gate arithmetic logic unit having inputs connected to the maximum top line, the minimum bottom line and a signal indicating a scan line count from the means for scanning the input scene.

11. The system of claim 10 in which the means for deriving the line gate signal comprises:

means for storing pluralities of data count pairs, each such plurality of data count pairs representing a silhouette of one of the known objects; and a line gate arithmetic logic unit having an input connected to the means for storing pluralities of data count pairs, and another input connected to an input scene horizontal location signal.

12. The system of claim 11 in which the means for calculating a quotient comprises:

an analog-to-digital converter having an input connected to the means for integrating the masked video signal; and a hard-wired digital divider having a denominator input connected to an output of the analog-to-digital converter, and a numerator input connected to a signal representing the amplitude of the correlation spot with which the area whose image energy is to be measured is associated.

13. In an optical matched filter system of the type which compares a plurality of memorized diffraction patterns of known objects to a diffraction pattern of an input scene and supplies correlation imagery to a suitable detector, said correlation imagery including a plurality of non-overlapping correlation maps arranged in a regular geometric array in a correlation plane, each correlation map representing the product of one of the memorized diffraction patterns and the diffraction pattern of the input scene, the improvement which comprises:

means for scanning the correlation plane to produce a video signal in proportion to the light intensity at a scan spot in the correlation plane;

means for detecting pulses in the video signal, said pulses having values within desired ranges of rising slope, amplitude, pulse width and falling slope;

means for memorizing an amplitude and location in the correlation plane of a maximum amplitude detected video pulse for each correlation map each time the correlation plane is scanned;

means for measuring image energy of each of a plurality of areas in the input scene, the locations of the areas in the input scene corresponding to locations of the video pulses in their respective correlation maps; and means for calculating a quotient of the amplitude of each maximum amplitude detected video pulse divided by the image energy of the associated area in the input scene.

14. The system of claim 13 which further comprises means for displaying a desired set of parameters for each maximum amplitude detected video pulse.

15. The system of claim 14 in which the desired set of parameters includes the location of the maximum amplitude detected video pulse in the associated correlation map, an identification of the memorized diffraction pattern corresponding to the associated correlation map, and a confidence indicator based on the quotient of the amplitude of maximum amplitude detected video pulse divided by the image energy of the associated area in the input scene.

16. The system of claim 13 in which the means for scanning the correlation plane comprises a television camera.

17. The system of claim 13 in which the means for measuring image energy comprises:

means for scanning the input scene to produce a video input signal in proportion to a light intensity at a scan spot in the input scene;

means for masking the video input signal such that a masked video signal output by said masking means replicates the video input signal when the area whose image energy is to be measured is being scanned, the masked video signal otherwise having a value of zero; and means for integrating the masked video signal.

18. The system of claim 13 in which the video signal comprises a time-varying voltage.

19. The system of claim 18 in which the means for detecting pulses in the video signal comprises:

a first comparator circuit having one input connected to the video signal and another input connected to a desired amplitude threshold voltage, such that an output of said first comparator circuit indicates when the amplitude of the video signal exceeds the desired amplitude threshold voltage;

a means for deriving a differentiated video signal;

a second comparator circuit having one input connected to the differentiated video signal and another input connected to a rising slope threshold voltage proportional to a desired rising slope threshold, such that an output of said second comparator circuit indicates when the amplitude of the video signal is increasing at a rate in excess of the desired rising slope threshold;

a first logic gate having inputs connected to the outputs of the first and second comparator circuits and outputting a threshold start signal indicating the beginning of a video pulse;

a one-shot circuit having an input connected to the threshold start signal and outputting a threshold detection signal in which a threshold pulse indicates the detection of a video pulse having values within the desired ranges of amplitude and rising slope, the duration of the threshold pulse corresponding to a desired bandwidth of the memorized diffraction patterns;

a third comparator circuit having one input connected to the video signal and another input connected to a falling slope threshold voltage proportional to a desired falling slope threshold such that the third comparator circuit outputs a falling slope threshold signal indicating when the amplitude of the video signal is decreasing faster than the desired falling slope threshold; and a second logic gate having inputs connected to the threshold detection signal and the falling slope threshold signal and outputting a peak detection signal.

20. The system of claim 19 in which the memorizing means comprises:
- a sample-and-hold circuit outputting a sampled video signal which is held at a level of the video signal when the differentiated video signal changes from positive to negative;
- a first analog-to-digital converter having an input connected to the sampled video signal and outputting a digital video signal;
- a first random access memory having an address input, a data input enabled by a write input, and a data output, the data input of said first random access memory being connected to the digital video signal; and
- a digital comparator having inputs connected to the digital video signal and the data output of the first random access memory, and outputting a write enable signal indicating when the digital video signal is greater than the data output of the first random access memory, the write input of the first random access memory being connected to the write enable signal.

21. The system of claim 20 in which the memorizing means further comprises:
- an oscillator circuit which outputs a horizontal data frequency signal;
- a first digital counter which counts oscillations in the horizontal data frequency signal and resets each time a count corresponding to a desired number of horizontal graduations in each correlation map is reached, such that an output of said first digital counter indicates a horizontal position of the scan spot in the correlation map being scanned;
- a second random access memory having an address input, a data input enabled by a write input, and a data output, the data and write inputs of said second random access memory being connected, respectively, to the output of the first digital counter and the write enable signal;
- a second digital counter which counts the horizontal lines scanned by the scanning means and resets each time a count corresponding to a desired number of horizontal lines in each correlation map is reached, such that an output of said second digital counter indicates a vertical position of the video signal in the correlation map being scanned; and
- a third random access memory having an address input, a data input enabled by a write input and a data output, the data and write inputs of said third random access memory being connected, respectively, to the output of the second digital counter and the write enable signal.

22. The system of claim 21 in which the memorizing means further comprises:
- a third digital counter which counts resets of the first digital counter and resets each time a count corresponding to a desired number of columns of correlation maps in the correlation plane is reached, such that an output of said third digital counter indicates a column number of the correlation map being scanned;
- a fourth digital counter which counts resets of the second digital counter and resets each time a count corresponding to a desired number of rows of correlation maps in the correlation plane is reached, such that an output of said fourth digital counter indicates a row number of the correlation map being scanned; and
- an address bus having inputs connected to the outputs of the third and fourth digital counters and an output connected to the address inputs of the first, second and third random access memories.

23. The system of claim 22 in which the means for measuring image energy comprises:
- means for scanning the input scene to produce a video input signal in proportion to a light intensity of a scan spot in the input scene;
- means for masking the video input signal such that a masked video signal output by said masking means replicates the video input signal when the area whose image energy is to be measured is being scanned, the masked video signal otherwise having a value of zero; and
- means for integrating the masked video signal.

24. The system of claim 23 in which the masking means comprises:
- means for deriving a height gate signal indicating that the scan spot in the input scene is traversing a scan line which passes through the area whose image energy is to be measured;
- means for deriving a line gate signal indicating when the scan spot, while traversing one of the scan lines which passes through the area whose image energy is to be measured, is within said area;
- means for combining the height gate signal and the line gate signal to form an integrator enable signal; and
- a switch activated by the integrator enable signal.

25. The system of claim 24 in which the means for deriving the height gate signal comprises:
- means for calculating a maximum top line and a minimum bottom line for each area in the input scene whose image energy is to be measured; and
- a height gate arithmetic logic unit having inputs connected to the maximum top line, the minimum bottom line and a signal indicating a scan line count from the means for scanning the input scene.

26. The system of claim 25 in which the means for deriving the line gate signal comprises:
- means for storing pluralities of data count pairs, each such plurality of data count pairs representing a silhouette of one of the known objects; and
- a width gate arithmetic logic unit having an input connected to the means for storing pluralities of data count pairs, and another input connected to an input scene horizontal location signal.

27. The system of claim 26 in which the means for calculating a quotient comprises:
- a fourth random access memory having an address input, a data input enabled by a write input, and a data output;
- means for connecting the address bus to a search address signal;
- a first storage register having an input connected to the address bus;
- a second storage register having an input connected to the data output of the first random access memory;
- an address gate having an input connected to the address bus and another input connected to the first storage register, the address input of the fourth random access memory being connected to an output of the address gate;
- means for generating a window gate trigger signal indicating that no data has been stored in the fourth random access memory at an address indicated by the search address signal and that data has been stored in the first random access memory at the address indicated by the search address signal, said window gate trigger signal being used to enable the first and second storage registers;

a second analog-to-digital converter having an input connected to the means for integrating the masked video signal; and a hard-wired digital divider having a denominator input connected to an output of the second analog to digital converter, a numerator input connected to an output of the second storage register, and an output connected to the data input of the fourth random access memory.

* * * * *